(12) United States Patent
Xia

(10) Patent No.: US 7,349,120 B2
(45) Date of Patent: Mar. 25, 2008

(54) METHOD FOR MULTIPLE-PAGE SCALING AND COMPOSING PRINTING

(75) Inventor: Chu Xia, Beijing (CN)

(73) Assignee: Primax Electronics Ltd., Taipei (TW)

( * ) Notice: Subject to any disclaimer, the term of this patent is extended or adjusted under 35 U.S.C. 154(b) by 1076 days.

(21) Appl. No.: 10/438,975

(22) Filed: May 16, 2003

(65) Prior Publication Data

US 2004/0227962 A1 Nov. 18, 2004

(51) Int. Cl.
*G06F 15/00* (2006.01)
*G06K 1/00* (2006.01)

(52) U.S. Cl. .................................... 358/1.2; 358/1.5

(58) Field of Classification Search ........ 358/1.1–1.18, 358/537, 452
See application file for complete search history.

(56) References Cited

U.S. PATENT DOCUMENTS

| | | | | |
|---|---|---|---|---|
| 6,295,385 | B1* | 9/2001 | Takaoka et al. | 382/289 |
| 6,804,024 | B1* | 10/2004 | Kizaki et al. | 358/1.18 |
| 6,820,543 | B2* | 11/2004 | Takasawa et al. | 101/115 |
| 7,184,165 | B2* | 2/2007 | Mori et al. | 358/1.15 |

* cited by examiner

*Primary Examiner*—Douglas Q. Tran
(74) *Attorney, Agent, or Firm*—Harness, Dickey & Pierce, P.L.C.

(57) ABSTRACT

A printing control method includes both scaling and composition functions for arranging several printing pages on a specified paper and printing. If operates with "fit to paper" scaling and "N-up" layout calculations. The user can setup a composite printing of several printing pages on a specified paper of a different size, so that the user has no need to do complicated adjustments or settings while papers are saved.

5 Claims, 3 Drawing Sheets

PAGE1/LINE1 + PAGE3/LINE1
PAGE1/LINE2 + PAGE3/LINE2
PAGE1/LINE3 + PAGE3/LINE3
......
PAGE1/LASTLINE + PAGE3/LASTLINE

700

PAGE2/LINE1 + PAGE4/LINE1
PAGE2/LINE2 + PAGE4/LINE2
PAGE2/LINE3 + PAGE4/LINE3
......
PAGE2/LASTLINE + PAGE4/LASTLINE

METHOD FOR MULTIPLE-PAGE SCALING AND COMPOSING PRINTING

BACKGROUND OF THE INVENTION

1. Field of the Invention

The invention generally relates to a programmed-control-method, and particularly relates to a method for controlling printing format of a printer.

2. Related Art

"Fit to paper" and "N-up" formats are two common control methods applied to conventional printers. The "fit to paper" is to scale and fit a printing page into a specified paper of printing. For example, for a printing page of letter size (21.59*27.94 cm) to be printed on a specified paper of A4 size (21*29.7 cm), the "fit to paper" automatically scales (reduces or enlarges) the printing page to the specified page, so the user has no need to consider and adjust the scaling settings before printing. The "N-up" is to combine and reduce several printing pages of a same size into a single page of the same size for printing. For example, the user can have the contents of four A4 printing pages printed on a single A4 page through the "N-up" setting so as to save papers.

However, though "fit to paper" and "N-up" are practical in printing, they have drawbacks that cause inconvenience to the users. For example, though "fit to paper" can help user scaling a printing page of a size into a specified paper of another size, it cannot help user scaling and printing several printing pages onto a single paper of a different size. The "N-up" is now limited to "a same size only" for all the printing pages and the specified paper. Therefore, they can do nothing when several printing pages are to be printed on a single paper of a different size.

Through software program design, it is a demand to have a printing control method that can include both functions of "fit to paper" and "N-up" and scale and compose several printing pages into any a specified paper so as to meet the needs of users.

SUMMARY OF THE INVENTION

The object of the invention is to solve the aforesaid printing control problems and to provide a programmed-control-method for printing with both "fit to paper" and "N-up" functions.

A method for controlling printing format of a printer according to the invention includes the following steps. First, calculating a page scaling ratio and a layout scaling ratio according to the printing page. Using the two ratios to get a logic scaling ratio, a logic resolution, a logic printing page size and a logic paper size. Finally, calculating positions of the logic printing pages on the logic paper, and finishing the printing to a specified paper according to the user's settings.

The printing control method of the invention has the following advantage that goes beyond prior arts: the user can setup a composite printing of several printing pages on a specified paper of a different size, so that the user has no need to make complicated adjustments or settings while papers are saved.

A method for controlling printing format of a printer according to the invention includes steps of getting printing settings; calculating logic printing parameters; then, getting output layout settings; and finally, finishing the printing according to the logic printing parameters and the output layout settings.

BRIEF DESCRIPTION OF THE DRAWINGS

The invention will become more fully understood from the detailed description given hereinbelow. However, this description is for purposes of illustration only, and thus is not limitative of the invention, wherein:

FIGS. 3A and 3B are explanatory views of components in a method of the invention.

DETAILED DESCRIPTION OF THE INVENTION

The invention provides a method for controlling printing format of a printer. The method is a programmed-control-method utilizing a driver incorporating "fit to paper" and "N-up" functions so that the user can easily have several printing pages printed on a specified paper.

Figure 1:
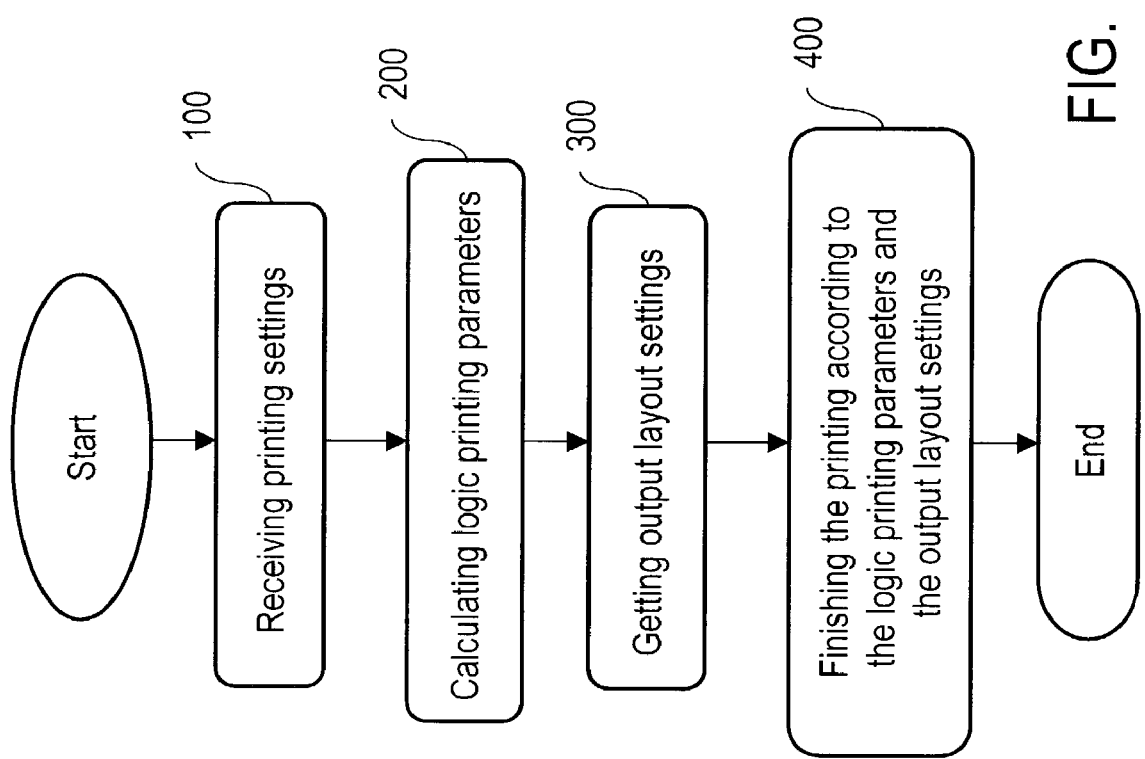
FIG. 1 is a main flowchart of a method of printing control according to the invention.

FIG. 1 is a main flowchart of a printing control method capable of scaling and composing a plurality of printing pages on a single paper. The steps are as follows.

First, receiving printing settings (step 100). The printing settings include: printing page size, output paper size, margins of the paper, number of pages to be composed, output resolution, and so on. The settings come from the user operations of printing process in the application software. Then, calculating logic printing parameters (step 200). This is the major process of the invention and will be described later with FIG. 2. After finishing the parameters calculation, getting output layout settings (step 300). The output layout settings also come from the user operations of printing process in the application software. The output layout settings are position or sequence of the printing pages in the output page. For example, a layout 500, as shown in FIG. 3-*a*, includes four pages (1, 2, 3, 4) arranged in a first downward, then rightward sequence (1-3-2-4). Finally, finishing the printing according to the logic printing parameters and the output layout settings (step 400).

Figure 2:
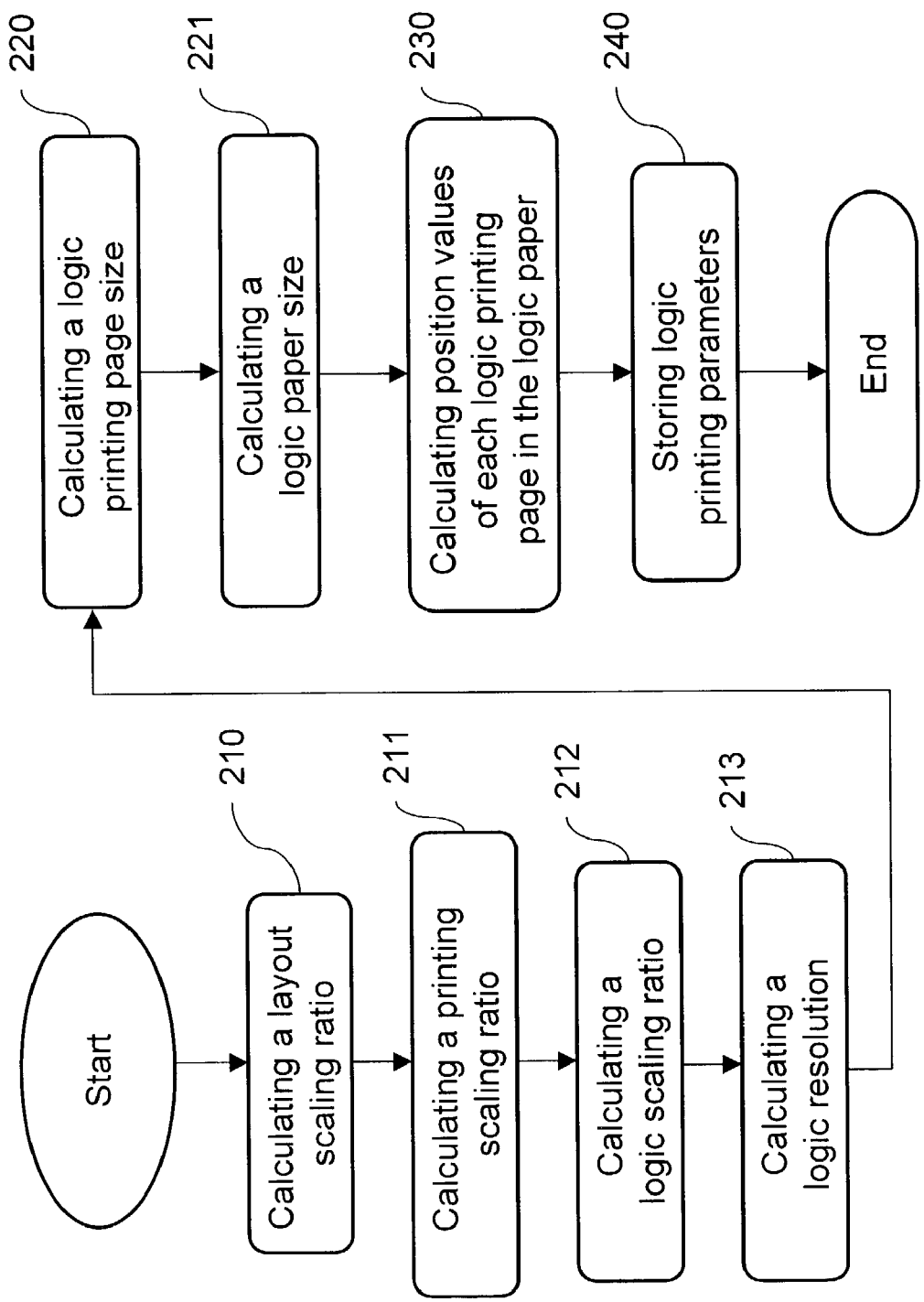
FIG. 2 is a partial flowchart of calculating logic printing parameters in a method of the invention.

FIG. 2 is a detailed flowchart of the step 200 of calculating logic printing parameters. First, calculating a layout scaling ratio, Scaling(A), (step 210) according to the number of pages to be composed and the paper size. Then, calculating a printing scaling ratio, Scaling(B), (step 211) according to the printing page size and the paper size. The calculations of the scaling ratios, Scaling(A) and Scaling(B), are of prior arts and will not be described in detail herein. And then, a logic scaling ratio, Scaling(C) is calculated (step 212) by multiplying Scaling(A) with Scaling(B). Further, calculating a logic resolution (step 213) by multiplying an original output resolution with the Scaling(C). Then, calculating a logic printing page size (step 220) and a logic paper size (step 221). The logic printing page size (including page width and page length) is calculated by multiplying the original printing page size (width and length respectively) with the Scaling(C). The logic paper size is calculated by multiplying a printable paper size (width and length respectively) with the Scaling(A). The so-called printable paper is calculated by subtracting margins of width and length from the original paper size. Finally, calculating position values of each logic printing page in the logic paper (step 230). The position values are expressed by vertical shifts and horizontal shifts calculated as follow:

Horizontal (left and right) shifts=(width of the printable paper−width of the logic printing page)/2;

Vertical (top and bottom) shifts=(length of the printable paper−length of the logic printing page)/2

Then, all the logic printing parameters are stored (step 240) and the step of calculation is finished. An embodiment of the invention with a calculation example is described as follows.

(1) printing page size: letter size (21.59*27.94 cm)
(2) paper size: A4 (21*29.7 cm)
(3) margins of width and length on the paper: all 0.5 cm
(4) number of pages to be composed: 4
(5) output resolution: 600 dpi (dot per inch)

Then, first calculating by prior arts the layout scaling ratio Scaling(A)=50%; and the printing scaling ratio Scaling(B) =97.27%;

And, calculating the logic scaling ratio Scaling(C) =50%*97.27%=43.64%;

Calculating the logic resolution with Scaling(C), 600*43.64%=261 dpi;

Calculating the logic printing page size: logic printing page width=21.59*43.64%=9.42 cm; logic printing page length=27.94*43.64%=12.19 cm;

Calculating the logic paper size: logic paper width=20.5*50%=10.25 cm, in which 20.5 cm is the printable paper width (21−0.5); logic paper length=29.2*50%=14.6 cm, in which 29.2 cm is the printable paper length (29.7−0.5);

Finally, calculating position values of each logic printing page in the logic paper, e.g., horizontal (left and right) shifts=(14.6−12.19)/2=1.2; vertical (top and bottom) shifts= (10.25−9.42)/2=0.415 cm.

After finishing calculation of all the logic printing parameters, the logic printing parameters, as well as the output layout settings (as 500 shown in FIG. 3-a) set by the user, are used to precisely compose the multiple printing pages on the specified paper. The printing sequence, as shown in FIG. 3-b, is first with the first portion printing 600, then the second portion printing 700 and finally finishes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for printing a plurality of image pages on a single paper comprising steps of:
    receiving printing settings including a size of the image page, a size of the paper, margins of the paper, a number of the image pages to be printed on the paper and an output resolution of the image pages;
    calculating logic printing parameters, including steps of:
    calculating a layout scaling ratio Scaling(A) according to the number of the image pages to be printed on the paper and the size of the paper;
    calculating a printing scaling ratio Scaling(B) according to the size of the image page and the size of the paper;
    calculating a logic scaling ratio Scaling(C) by multiplying the Scaling(A) with the Scaling(B);
    calculating a logic resolution by multiplying an original output resolution with the Scaling(C):
    calculating a logic page size and a logic paper size, wherein the logic page size is calculated by multiplying the page size with the Scaling(C) and the logic paper size is calculated by multiplying a printable paper size with the Scaling(A) and wherein the printable paper is calculated by substracting the margins from the paper size;
    calculating position values of the image pages on the logic paper;
    storing all the logic printing parameters after caculating the logic printing parameters;
    receiving a layout setting of arranging all the image pages on the paper; and
    printing the image pages on the paper according to the logic printing parameters and the layout settings.

2. The method for printing a plurality of image pages on a single paper according to claim 1, wherein said logic image page size comprises a page width and a page length; said page width is a multiplication of said image page width to said logic scaling ratio Scaling(C); said page length is a multiplication of said image page length to said logic scaling ratio Scaling(C).

3. The method for printing a plurality of image pages on a single paper according to claim 2, wherein said logic paper size comprises a page width and a page length; said page width is a multiplication of a printable paper width to said layout scaling ratio Scaling(A); said page length is a multiplication of a printable paper length to said layout scaling ratio Scaling(A).

4. The method for printing a plurality of image pages on a single paper according to claim 3, wherein said printable paper width and printable paper length are subtractions of said margins of paper from said paper size.

5. The method for printing a plurality of image pages on a single paper according to claim 4, wherein the position values of said logic image page in said logic paper comprises a horizontal shift calculated by a half of a subtraction of said logic image page width from said printable paper width; and a vertical shift calculated by a half of a subtraction of said logic image page length from said printable paper length.

* * * * *